US012687725B2

(12) United States Patent
Menezes et al.

(10) Patent No.: US 12,687,725 B2
(45) Date of Patent: Jul. 21, 2026

(54) IMPRINT LITHOGRAPHY USING MULTI-LAYER COATING ARCHITECTURE

(71) Applicant: Magic Leap, Inc., Plantation, FL (US)

(72) Inventors: Marlon Edward Menezes, Austin, TX (US); Vikramjit Singh, Pflugerville, TX (US); Frank Y. Xu, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 195 days.

(21) Appl. No.: 18/555,502

(22) PCT Filed: Apr. 21, 2022

(86) PCT No.: PCT/US2022/071832
§ 371 (c)(1),
(2) Date: Oct. 13, 2023

(87) PCT Pub. No.: WO2022/226515
PCT Pub. Date: Oct. 27, 2022

(65) Prior Publication Data
US 2024/0045216 A1 Feb. 8, 2024

Related U.S. Application Data

(60) Provisional application No. 63/177,828, filed on Apr. 21, 2021.

(51) Int. Cl.
*G02B 27/01* (2006.01)
*B29D 11/00* (2006.01)
(Continued)

(52) U.S. Cl.
CPC .... *G02B 27/0172* (2013.01); *B29D 11/00663* (2013.01); *B29D 11/0073* (2013.01);
(Continued)

(58) Field of Classification Search
CPC ................. G02B 27/0172; G02B 6/34; G02B 2027/0178; B29D 11/00663;
(Continued)

(56) References Cited

U.S. PATENT DOCUMENTS

| 4,852,988 A | 8/1989 | Velez |
| 6,433,760 B1 | 8/2002 | Vaissie |

(Continued)

FOREIGN PATENT DOCUMENTS

| CA | 2316473 A1 | 1/2001 |
| CA | 2362895 A1 | 12/2002 |

(Continued)

OTHER PUBLICATIONS

Jacob, R. "Eye Tracking in Advanced Interface Design", Virtual Environments and Advanced Interface Design, Oxford University Press, Inc. (Jun. 1995).

(Continued)

*Primary Examiner* — Jerry M Blevins
(74) *Attorney, Agent, or Firm* — Zi Y. Wong; Via LLP

(57) ABSTRACT

Structures for forming an optical feature and methods for forming the optical feature are disclosed. In some embodiments, the structure comprises a patterned layer comprising a pattern corresponding to the optical feature; a base layer; and an intermediate layer bonded to the patterned layer and the base layer.

16 Claims, 13 Drawing Sheets

(51) Int. Cl.

| | |
|---|---|
| *G02B 6/34* | (2006.01) |
| *B29K 25/00* | (2006.01) |
| *B29K 33/00* | (2006.01) |
| *B29K 63/00* | (2006.01) |
| *B29K 69/00* | (2006.01) |

(52) U.S. Cl.
CPC .......... *B29D 11/00769* (2013.01); *G02B 6/34* (2013.01); *B29K 2025/00* (2013.01); *B29K 2033/00* (2013.01); *B29K 2063/00* (2013.01); *B29K 2069/00* (2013.01); *B29K 2995/0024* (2013.01); *B29K 2995/0097* (2013.01); *G02B 2027/0178* (2013.01)

(58) Field of Classification Search
CPC .......... B29D 11/0073; B29D 11/00769; B29K 2025/00; B29K 2033/00; B29K 2063/00; B29K 2069/00; B29K 2995/0024; B29K 2995/0097
USPC .......................................................... 385/37
See application file for complete search history.

(56) References Cited

U.S. PATENT DOCUMENTS

| | | | |
|---|---|---|---|
| 6,491,391 | B1 | 12/2002 | Blum et al. |
| 6,847,336 | B1 | 1/2005 | Lemelson |
| 6,943,754 | B2 | 9/2005 | Aughey |
| 6,977,776 | B2 | 12/2005 | Volkenandt et al. |
| 7,347,551 | B2 | 3/2008 | Fergason et al. |
| 7,488,294 | B2 | 2/2009 | Torch |
| 8,235,529 | B1 | 8/2012 | Raffle |
| 8,611,015 | B2 | 12/2013 | Wheeler |
| 8,638,498 | B2 | 1/2014 | Bohn et al. |
| 8,696,113 | B2 | 4/2014 | Lewis |
| 8,929,589 | B2 | 1/2015 | Publicover et al. |
| 9,010,929 | B2 | 4/2015 | Lewis |
| 9,274,338 | B2 | 3/2016 | Robbins et al. |
| 9,292,973 | B2 | 3/2016 | Bar-zeev et al. |
| 9,323,325 | B2 | 4/2016 | Perez et al. |
| 9,720,505 | B2 | 8/2017 | Gribetz et al. |
| 10,013,053 | B2 | 7/2018 | Cederlund et al. |
| 10,025,379 | B2 | 7/2018 | Drake et al. |
| 2002/0151181 | A1 | 10/2002 | Boudreau et al. |
| 2003/0030597 | A1 | 2/2003 | Geist |
| 2006/0023158 | A1 | 2/2006 | Howell et al. |
| 2006/0035034 | A1 | 2/2006 | Matsumoto et al. |
| 2011/0211056 | A1 | 9/2011 | Publicover et al. |
| 2011/0213664 | A1 | 9/2011 | Osterhout |
| 2012/0021806 | A1 | 1/2012 | Maltz |
| 2012/0081696 | A1* | 4/2012 | Boersma ............ G02B 6/02104 356/73.1 |
| 2013/0077147 | A1 | 3/2013 | Efimov |
| 2014/0036339 | A1 | 2/2014 | Tonar et al. |
| 2014/0195918 | A1 | 7/2014 | Friedlander |
| 2015/0168731 | A1 | 6/2015 | Robbins |
| 2019/0129178 | A1 | 5/2019 | Patterson et al. |
| 2019/0250458 | A1 | 8/2019 | Robinson et al. |
| 2020/0165739 | A1* | 5/2020 | Bray ................... C23C 18/2033 |
| 2020/0271840 | A1 | 8/2020 | Klug et al. |

FOREIGN PATENT DOCUMENTS

| | | | | |
|---|---|---|---|---|
| CA | | 2388766 A1 | 12/2003 | |
| WO | WO-2020185954 A1 * | | 9/2020 | ....... B29D 11/00769 |

OTHER PUBLICATIONS

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

Extended European Search Report dated Feb. 7, 2025, for EP Application No. 22792697.9, thirteen pages.

International Preliminary Report on Patentability and Written Opinion mailed Nov. 2, 2023, for PCT Application No. PCT/US2022/071832, eight pages.

* cited by examiner

200

2120 2114

2144 2142

2118 2112 2102

2122 2116

200

RIGHT SOURCE OF IMAGEWISE MODULATED LIGHT — 2126

2110 2206

2118 2120

2404 2402

2406 2120

2118

300

350

350

348                          304

346

320

2106

2128

800

| | |
|---|---|
| Provide a base layer | 802 |
| Deposit an intermediate layer | 804 |
| Bond the intermediate layer | 806 |
| Deposit a patterned layer | 808 |
| Bond the patterned layer | 810 |

IMPRINT LITHOGRAPHY USING MULTI-LAYER COATING ARCHITECTURE

CROSS-REFERENCE TO RELATED APPLICATIONS

This application is a national stage application under 35 U.S.C. § 371 of International Application No. PCT/US2022/71832, filed internationally on Apr. 21, 2022, which claims priority to U.S. Provisional Application No. 63/177,828, filed on Apr. 21, 2021, the contents of which are both incorporated by reference herein in its entirety.

FIELD

This disclosure relates in general to imprint lithography using a multi-layer structure.

BACKGROUND

The process of imprint lithography may include a curable solution being deposited (e.g., inkjetted, slot-die coated) on a substrate and coming in contact with a template. The template may include a desirable micro-pattern or nano-pattern. After curing, the solution solidifies as a patterned layer (e.g., a patterned polymer layer) on the substrate. The performance (e.g., pattern fidelity, defect generation, throughput, imprint life) of imprint lithography may be negatively affected by poor adhesion and/or excessive undesired chemical interaction associated with the solution. The undesired chemical interaction may include solution swelling, locally dissolving polymeric chain of the substrate polymer, or chemical imprint incompatibility between the solution (e.g., low viscosity imprint) and the substrate (e.g., a bare Polycarbonate ("PC") ($[OC(OC_6H_4)_2CMe_2]_n$) film)). In turn, the patterned solution may negatively affect a structure (e.g., a waveguide) created by the pattern. Therefore, it is desirable to improve the patterns by reducing the negative effects in a cost effective manner.

BRIEF SUMMARY

Structures for forming an optical feature and methods for forming the optical feature are disclosed. In some embodiments, the structure comprises a patterned layer comprising a pattern corresponding to the optical feature; a base layer; and an intermediate layer bonded to the patterned layer and the base layer.

In some embodiments, a bond between the patterned layer and the intermediate layer comprises a covalent bond, a physical bond, or both.

In some embodiments, the base layer comprises PC.

In some embodiments, the intermediate layer has a thickness of 1-25 μm.

In some embodiments, the patterned layer has a thickness of 5 μm to 6 μm.

In some embodiments, a width of the patterned layer is 25 mm to 450 mm.

In some embodiments, the patterned layer is configured to form a pattern of a waveguide.

In some embodiments, a topography of the patterned layer comprises a waviness of 20 nm to 25 nm.

In some embodiments, the patterned layer comprises Methacrylates or acrylates.

In some embodiments, the patterned layer comprises plastic.

In some embodiments, the patterned layer comprises polymers comprising epoxy and vinyl dual functionality.

In some embodiments, the patterned layer comprises a curable solution.

In some embodiments, the intermediate layer comprises a crosslinked polymer coating.

In some embodiments, the base layer comprises a flexible substrate.

In some embodiments, the patterned layer is configured to form an antireflective feature comprising dimensions of 10-150 nm.

In some embodiments, the patterned layer is configured to form wire grid polarizers comprising dimensions of 10-100 nm.

In some embodiments, the patterned layer is configured to form optical gratings comprising dimensions of 100-1000 nm.

In some embodiments, the patterned layer is configured to form optical alignment fiducials comprising dimensions of 0.1-1000 μm.

In some embodiments, a method of fabricating an optical stack comprising an optical feature, comprises: providing a base layer; depositing an intermediate layer on the base layer; bonding the intermediate layer to the base layer; depositing, on the intermediate layer, a patterned layer comprising a pattern corresponding to the optical feature; and bonding the patterned layer to the intermediate layer.

In some embodiments, the method further comprises forming the optical feature of the optical stack by using the patterned layer.

In some embodiments, the optical stack is a waveguide.

In some embodiments, forming the optical feature comprises Plate-to-Plate, Plate-to-Roll, Roll-to-Roll, or Roll-to-Plate imprinting.

In some embodiments, the method further comprises curing the patterned layer.

In some embodiments, depositing the patterned layer on the intermediate layer comprises imprinting, using slot-die, using micro gravure, using knife edge, using doctor blade, or spray coating.

In some embodiments, a bond between the patterned layer and the intermediate layer comprises a covalent bond, a physical bond, or both.

In some embodiments, the base layer comprises PC.

In some embodiments, the intermediate layer has a thickness of 1-25 μm.

In some embodiments, the patterned layer has a thickness of 5 μm to 6 μm.

In some embodiments, a width of the patterned layer is 25 mm to 450 mm.

In some embodiments, a topography of the patterned layer comprises a waviness of 20 nm to 25 nm.

In some embodiments, the patterned layer comprises Methacrylates or acrylates.

In some embodiments, the patterned layer comprises plastic.

In some embodiments, the patterned layer comprises polymers comprising epoxy and vinyl dual functionality.

In some embodiments, the patterned layer comprises a curable solution.

In some embodiments, the intermediate layer comprises a crosslinked polymer coating.

In some embodiments, the base layer comprises a flexible substrate.

In some embodiments, the pattern comprises an antireflective feature comprising dimensions of 10-150 nm.

In some embodiments, the pattern comprises wire grid polarizers comprising dimensions of 10-100 nm.

In some embodiments, the pattern comprises optical gratings comprising dimensions of 100-1000 nm.

In some embodiments, the pattern comprises optical alignment fiducials comprising dimensions of 0.1-1000 μm.

In some embodiments, a system comprises a wearable head device comprising a display. The display comprises an optical stack comprising an optical feature, and the optical feature is formed using a structure described above. The system comprises one or more processors configured to execute a method comprising presenting, on the display, content associated with a mixed reality environment, wherein the content is presented based on the optical feature.

DETAILED DESCRIPTION

Figure 1A:
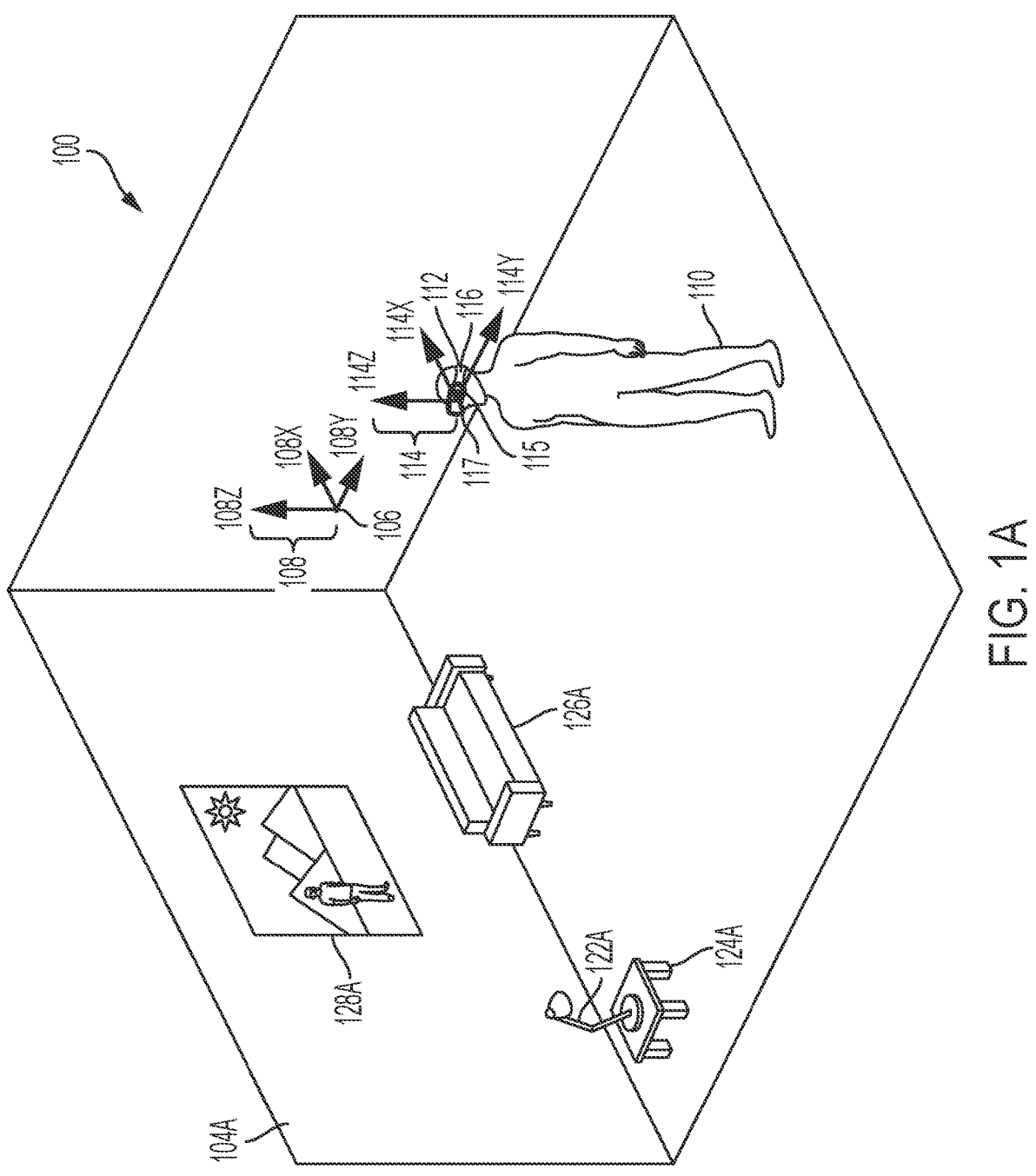
FIGS. 1A-1C illustrate exemplary environments, according to one or more embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists as a computational structure, a user may not directly perceive a virtual environment using one's ordinary senses. Instead, a user can perceive a virtual environment indirectly, as presented to the user, for example by a display, speakers, haptic output devices, etc. Similarly, a user may not directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the wearable head device. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

In some examples, virtual objects hay have characteristics that resemble corresponding real objects. For instance, a virtual character may be presented in a virtual or mixed reality environment as a life-like figure to provide a user an immersive mixed reality experience. With virtual characters having life-like characteristics, the user may feel like he or she is interacting with a real person. In such instances, it is desirable for actions such as muscle movements and gaze of the virtual character to appear natural. For example, movements of the virtual character should be similar to its corresponding real object (e.g., a virtual human should walk or move its arm like a real human). As another example, the gestures and positioning of the virtual human should appear natural, and the virtual human can initial interactions with the user (e.g., the virtual human can lead a collaborative experience with the user). Presentation of virtual characters having life-like characteristics is described in more detail herein.

Compared to virtual reality (VR) systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted herein, a user may not directly perceive or interact with a virtual environment—a user of an mixed reality ("MR") system may find it more intuitive and natural to interact with a virtual object by seeing, hearing, and touching a corresponding real object in his or her own real environment. This level of interactivity may heighten a user's feelings of immersion, connection, and engagement with a virtual environment. Similarly, by simultaneously presenting a real environment and a virtual environment, mixed reality systems may reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an exemplary real environment 100 in which a user 110 uses a mixed reality system 112. Mixed reality system 112 may comprise a display (e.g., a transmissive display), one or more speakers, and one or more sensors (e.g., a camera), for example as described herein. The real environment 100 shown comprises a rectangular room 104A, in which user 110 is standing; and real objects 122A (a lamp), 124A (a table), 126A (a sofa), and 128A (a painting). Room 104A may be spatially described with a location coordinate (e.g., coordinate system 108); locations of the real environment 100 may be described with respect to an origin of the location coordinate (e.g., point 106). As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a quaternion matrix, or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a quaternion matrix, or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
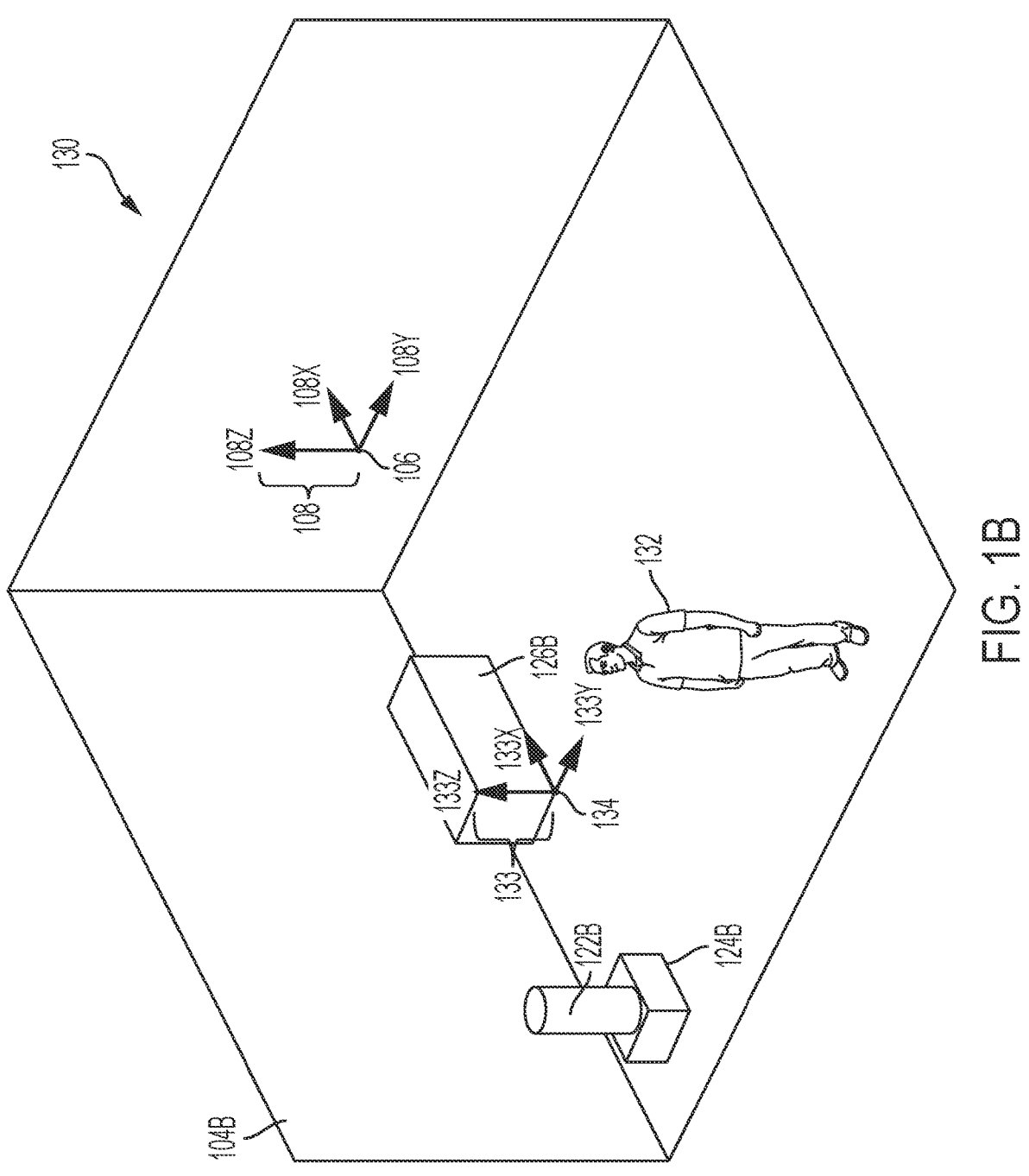

FIG. 1B illustrates an exemplary virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual character 132, which may not correspond to any real object in real environment 100. Real object 128A in real environment 100 may not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a quaternion matrix, or other rotation matrix), or other suitable representation can characterize a transformation between the persistent coordinate system 133 space and the environment/world coordinate system 108 space. In some embodiments, each of the virtual objects 122B, 124B, 126B, and 132 may have its own persistent coordinate point relative to the origin point 134 of the persistent coordinate system 133. In some embodiments, there may be multiple persistent coordinate systems and each of the virtual objects 122B, 124B, 126B, and 132 may have its own persistent coordinate points relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a quaternion matrix, or other rotation matrix), or other suitable representation can characterize a transformation between a real environment coordinate space and a virtual environment coordinate space.

Figure 1C:
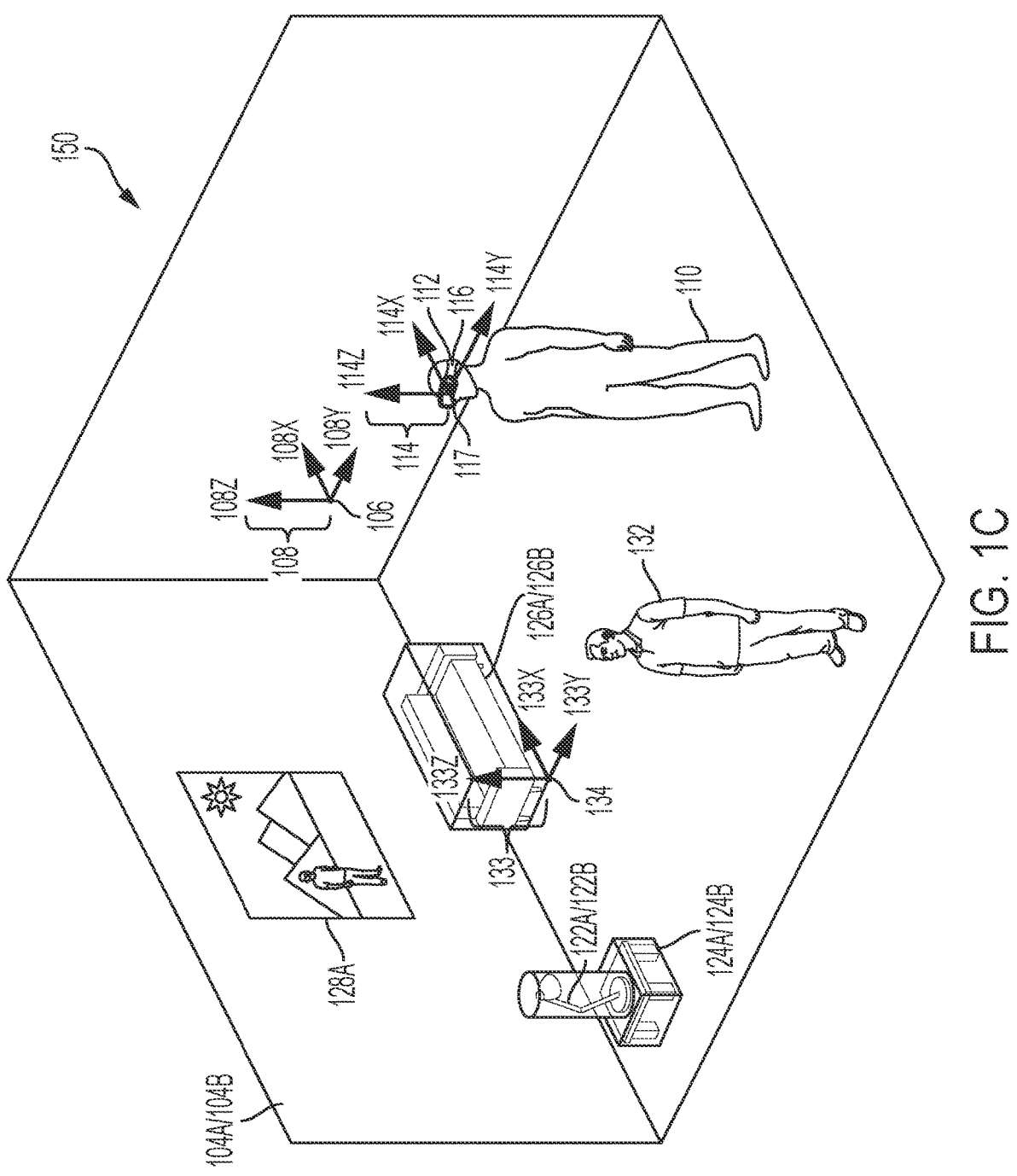

FIG. 1C illustrates an exemplary MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As described herein, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (e.g., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described herein may also incorporate audio aspects. For instance, in MRE 150, virtual character 132 could be associated with one or more audio signals, such as a footstep sound effect that is generated as the character walks around MRE 150. As described herein, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability, mobile network (e.g., 4G, 5G) capability) to communicate with other devices and systems, including neural networks (e.g., in the cloud) for data processing and training data associated with presentation of elements (e.g., virtual character 132) in the MRE 150 and other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described herein.

In some embodiments, an animation rig is used to present the virtual character 132 in the MRE 150. Although the animation rig is described with respect to virtual character 132, it is understood that the animation rig may be associated with other characters (e.g., a human character, an animal character, an abstract character) in the MRE 150. Movement of the animation rig is described in more detail herein.

Figure 2A:
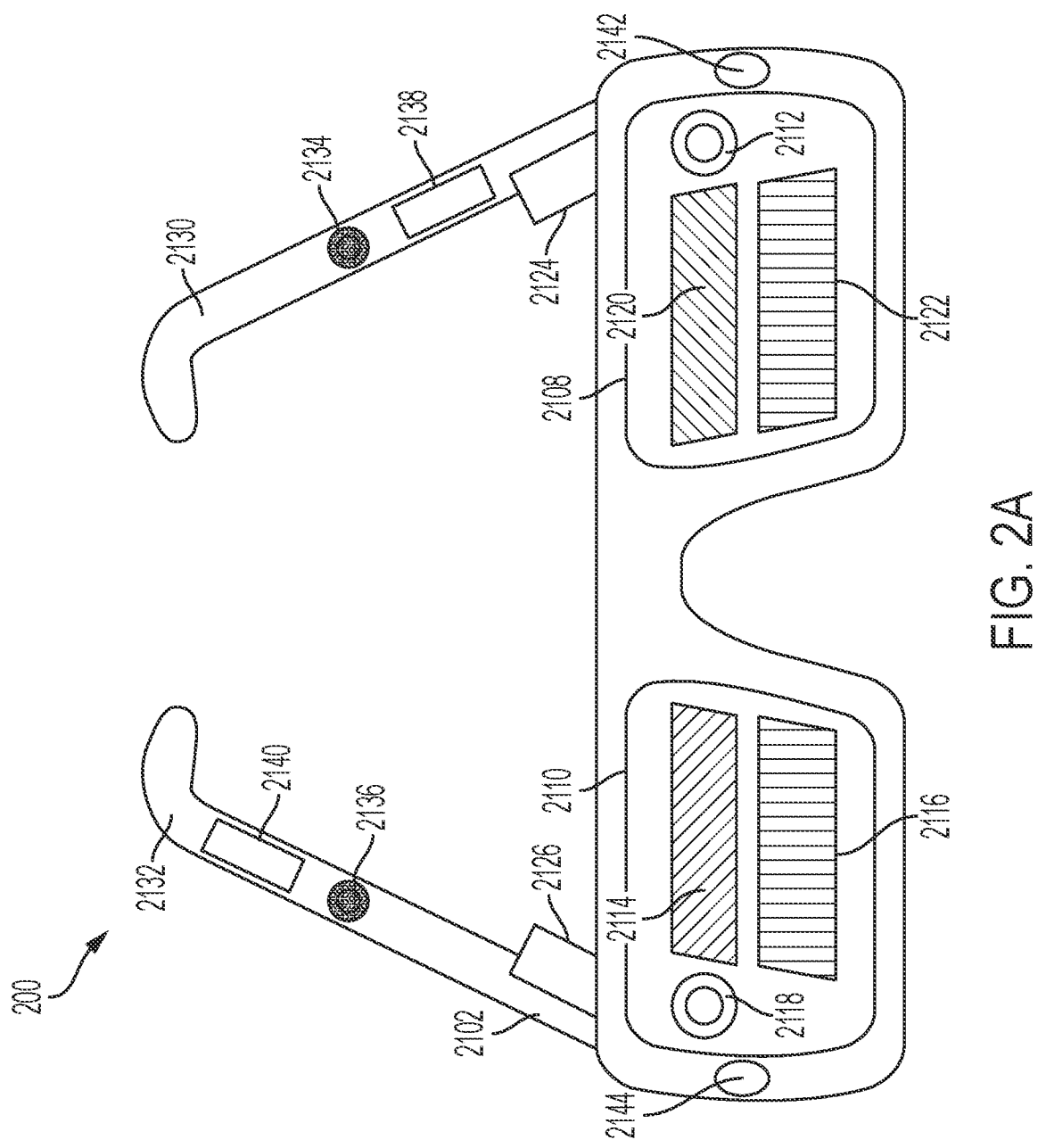
FIGS. 2A-2D illustrate components of exemplary mixed reality systems, according to embodiments of the disclosure.
Figure 2B:
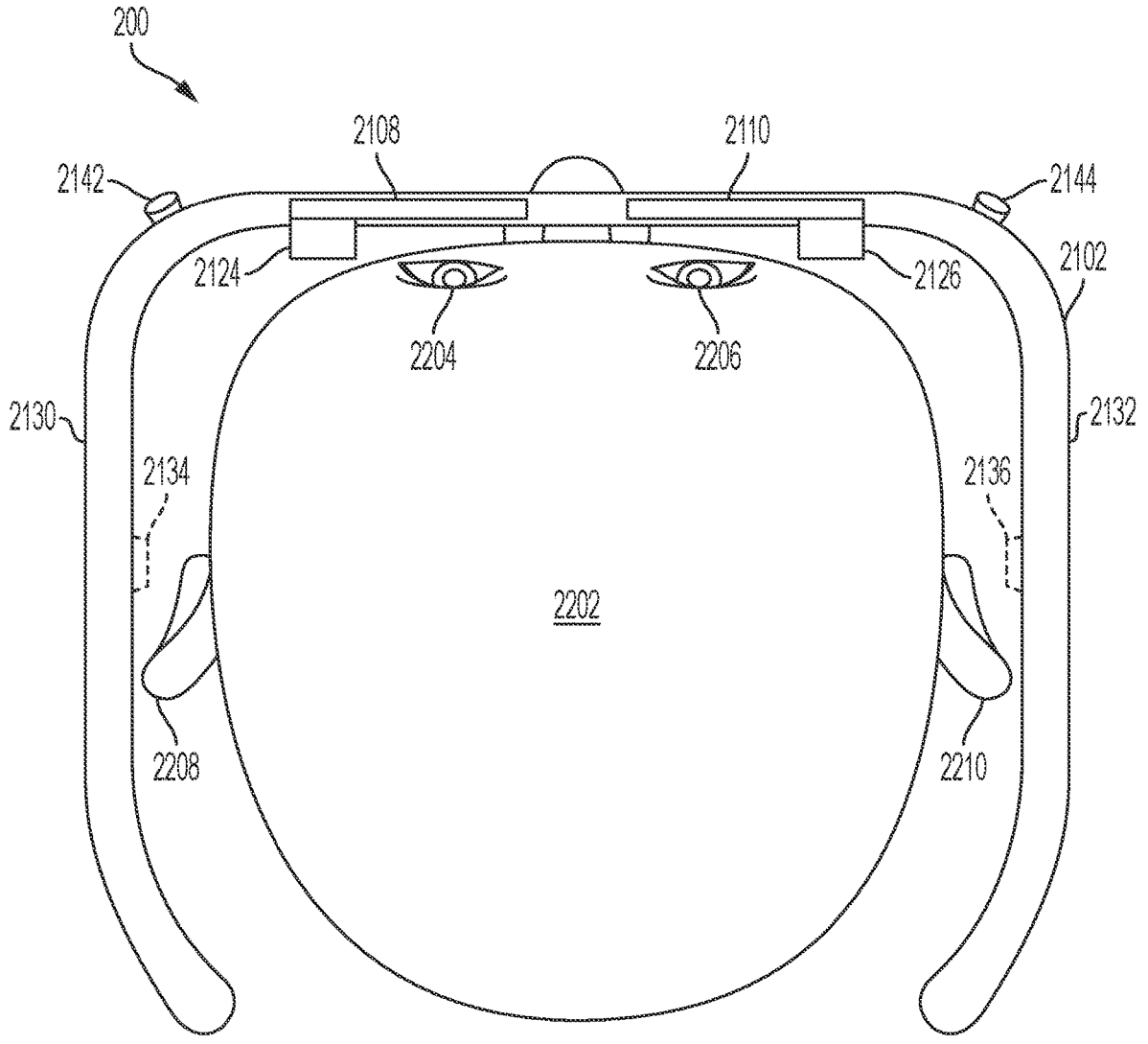
Figure 2C:
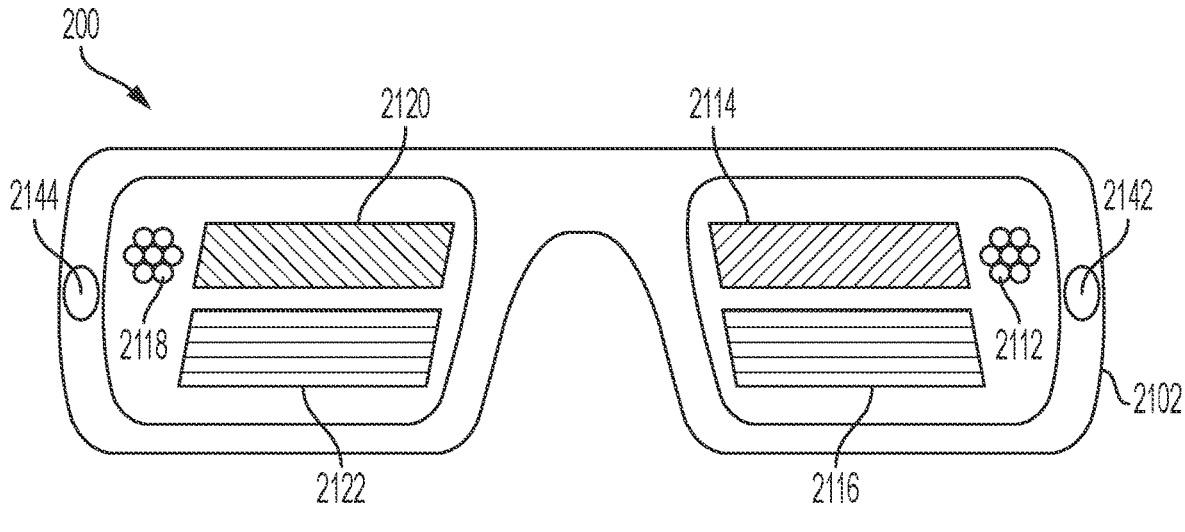
Figure 2D:
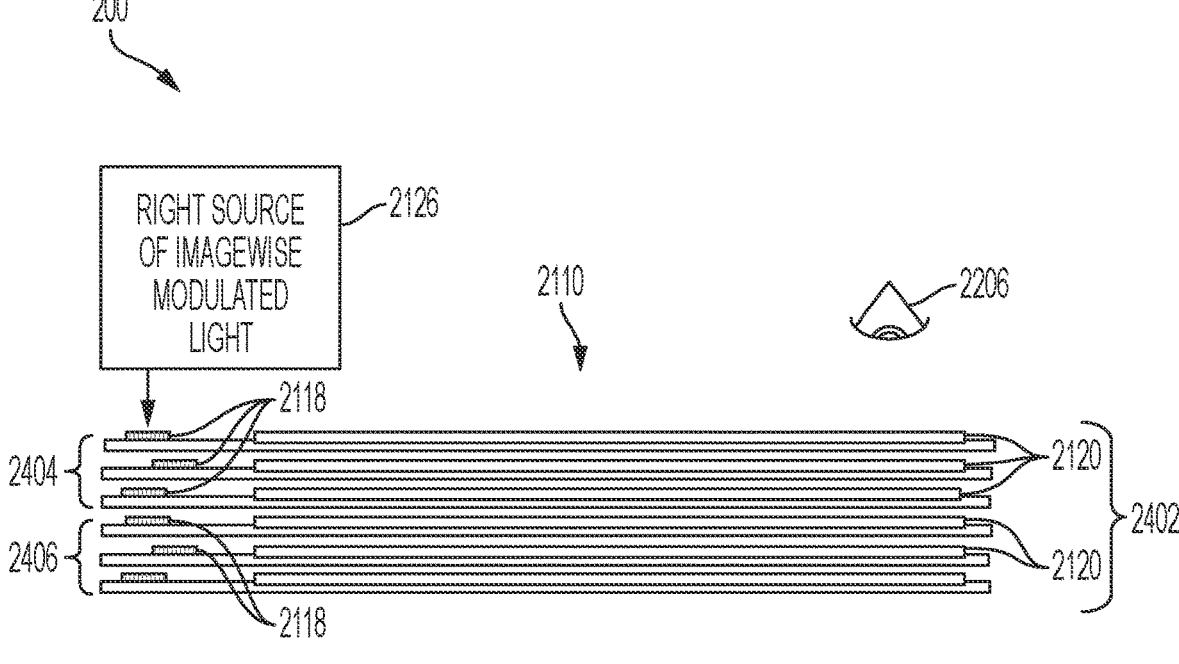

FIGS. 2A-2D illustrate components of an exemplary mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an exemplary left eyepiece (e.g., a left transparent waveguide set eyepiece) 2108 and an exemplary right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue, and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. Although not shown in FIG. 2D, the structure of the left eyepiece 2108 may be mirrored relative to the structure of the right eyepiece 2110.

Figure 3A:
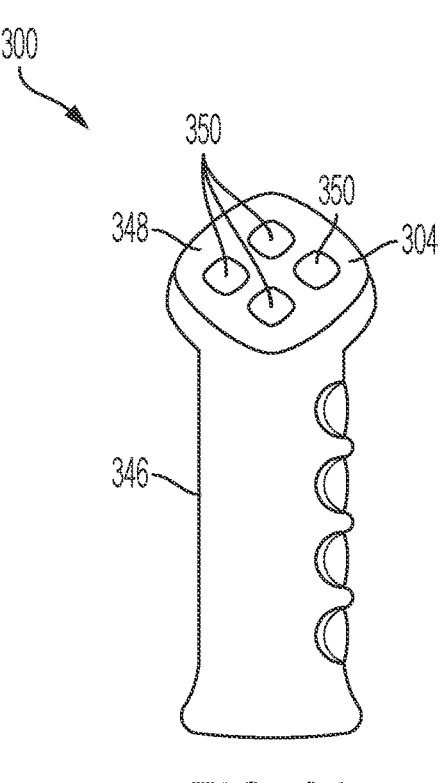
FIG. 3A illustrates an exemplary mixed reality handheld controller, according to embodiments of the disclosure.

FIG. 3A illustrates an exemplary handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
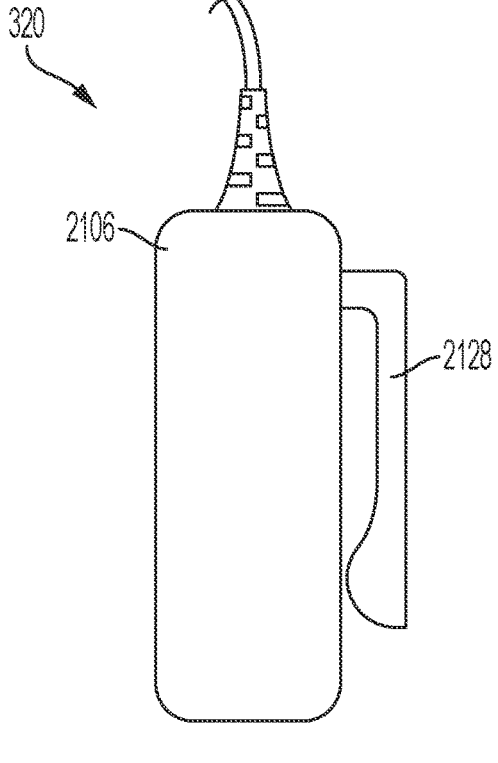
FIG. 3B illustrates an exemplary auxiliary unit, according to embodiments of the disclosure.

FIG. 3B illustrates an exemplary auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
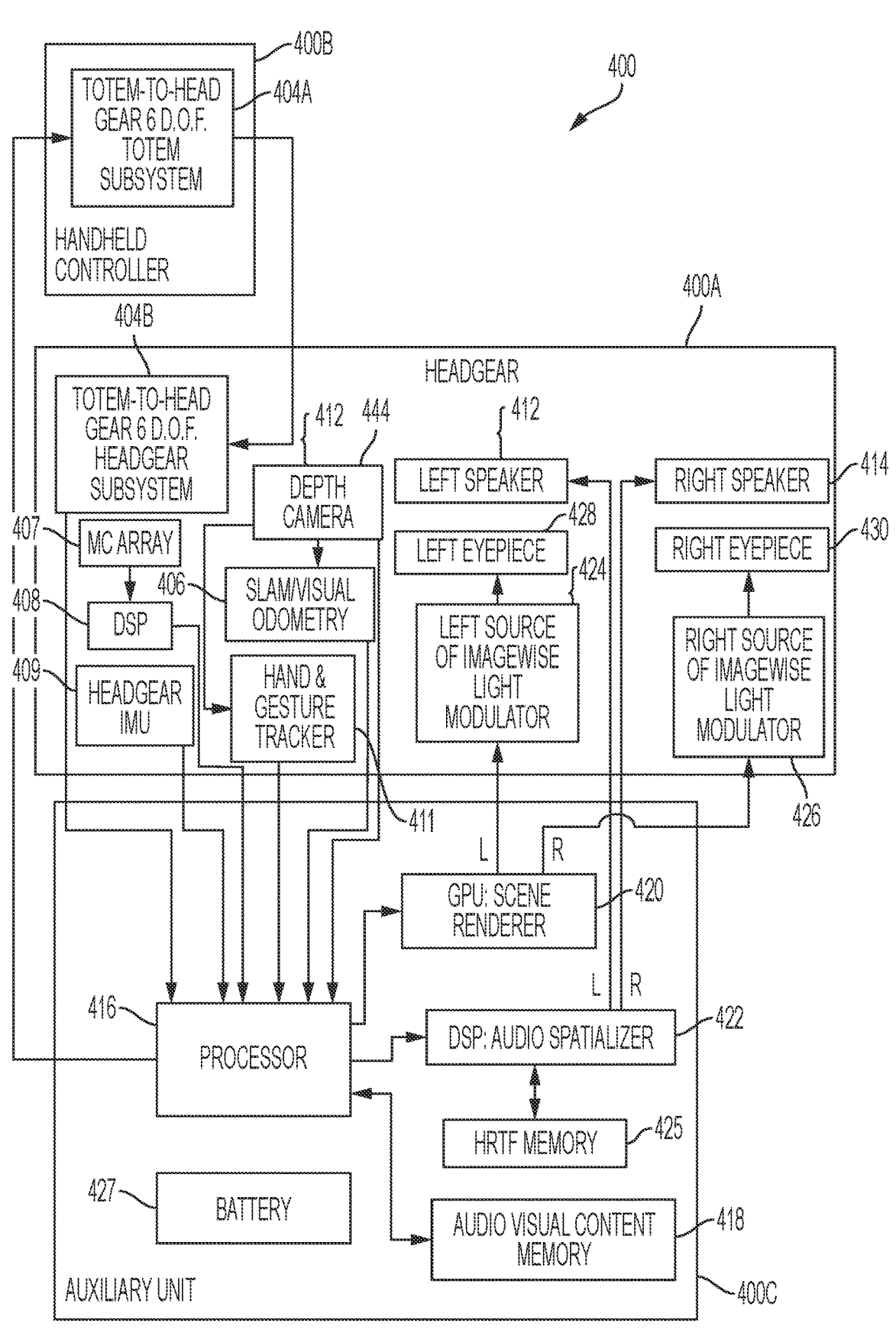
FIG. 4 illustrates an exemplary functional block diagram of an exemplary mixed reality system, according to embodiments of the disclosure.

FIG. 4 shows an exemplary functional block diagram that may correspond to an exemplary mixed reality system, such as mixed reality system 200 described herein (which may correspond to mixed reality system 112 with respect to FIG. 1). Elements of wearable system 400 may be used to implement the methods, operations, and features described in this disclosure. As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch, and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described herein, or dedicated optical targets included in the handheld controller 400B) can be used for 6DOF tracking. In some examples, the handheld controller 400B can include a camera, as described herein; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some embodiments, wearable system 400 can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right). In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A (e.g., of MR system 112) relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/ visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 (e.g., for displaying content on left eyepiece 428) and a right channel output coupled to the right source of imagewise modulated light 426 (e.g., for displaying content on right eyepiece 430). GPU 420 can output stereoscopic image data to the sources of imagewise modulated light 424, 426, for example as described herein with respect to FIGS. 2A-2D. In some examples, the GPU 420 may be used to render virtual elements in the MRE presented on the display of the wearable system 400. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described herein). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example wearable systems 400, various other suitable arrangements of these components will become apparent to those skilled in the art. For example, the headgear device 400A illustrated in may include a processor and/or a battery (not shown). The included processor and/or battery may operate together with or operate in place of the processor and/or battery of the auxiliary unit 400C. Generally, as another example, elements presented or functionalities described with respect to FIG. 4 as being associated with auxiliary unit 400C could instead be associated with headgear device 400A or handheld controller 400B. Furthermore, some wearable systems may forgo entirely a handheld controller 400B or auxiliary unit 400C. Such changes and modifications are to be understood as being included within the scope of the disclosed examples.

Figure 5:
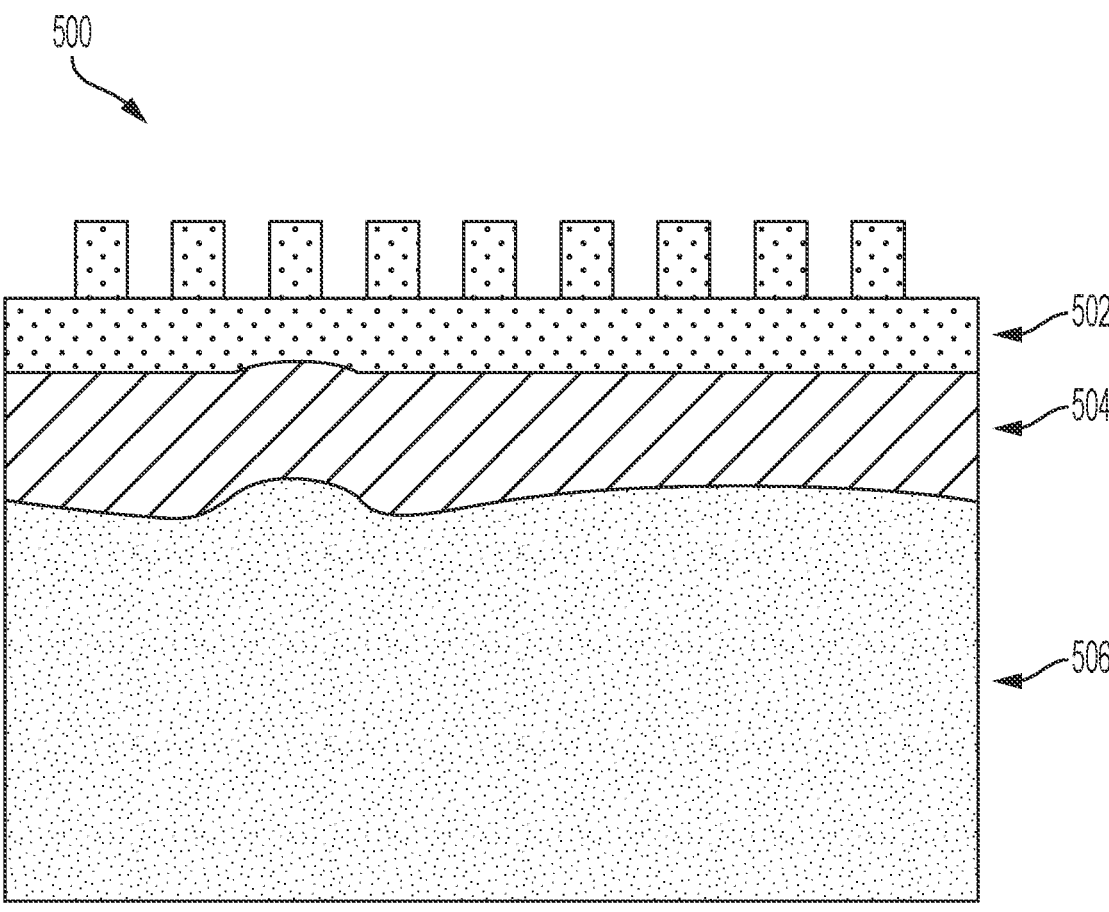
FIG. 5 illustrates an exemplary structure, according to embodiments of the disclosure.

FIG. 5 illustrates an exemplary structure 500, according to embodiments of the disclosure. In some embodiments, the structure 500 is an imprint (e.g., a mold, a structure for forming an optical feature (e.g., a waveguide pattern, a geometric feature on an optical stack (e.g., structure 710) configured to control transmissivity of radiation of a particular wavelength)). For example, the structure 500 can be an imprint for creating nano-scale or micron-scale structures (e.g., a waveguide (e.g., a waveguide 2402 of eyepiece 2108 or 2110) of a wearable head device eyepiece or a MR system, as described with respect to FIGS. 1-4; a waveguide including features comprising dimensions in orders of hundreds of nm; a waveguide including antireflection features comprising dimensions in orders of tens of nm; an optical structure comprising alignment fiducials comprising dimensions in orders of ones to tens of μm; patterned plastic; CRT templating; structure 710).

In some embodiments, a wearable device (e.g., a wearable head device eyepiece or a MR system, as described with respect to FIGS. 1-4) comprises a display, and the display comprises an optical stack comprising an optical feature. In some embodiments, the optical feature is formed using structure 500. In some embodiments, the display is configured to present content associated with a MR environment, and the content is presented based on the optical feature.

In some embodiments, the structure 500 comprises patterned layer 502, intermediate layer 504, and base layer 506. For example, the patterned layer 502 is a nano-patterned or micro-patterned imprint layer, the intermediate layer 504 is an intermediate imprint layer, and the base layer 506 is a carrier substrate or a carrier film. For example, the patterned layer comprises a pattern corresponding to an optical feature (e.g., the pattern of the patterned layer provides an imprint for creating a pattern of an optical waveguide).

In some embodiments, the patterned layer 502 comprises a low viscosity (e.g., <10 cps) or a medium viscosity (e.g., between 10 cps and 1000 cps) resist material. For example, the patterned layer 502 comprises an imprint solution used in J-FIL™ type processes. In some embodiments, the patterned layer 502 comprises components configured to aid properties such as—pattern filling, substrate adhesion, mechanical strength (e.g., high elastic modulus), and proper release performance from the template. In some embodiments, the patterned layer 502 comprises polymers comprising esters derived from acrylic acids and/or its derivatives, such as Methacrylates and acrylates. In some embodiments, the patterned layer 502 comprises polymers comprising epoxy and vinyl dual functionality (e.g., use of epoxy vinyl esters where the vinyl monomer may be methyl methacrylate, difunctional or trifunctional vinyl monomers, such as diacrylates, triacrylates, dimethacrylates). In some embodiments, the patterned layer 502 comprises plastic.

In some embodiments, the intermediate layer 504 comprises a crosslinked polymer coating (e.g., a thermosetting polymer top coated layer). In some embodiments, imprinting, slot-die, micro gravure, knife edge, doctor blade, or spray coating is used to deposit the intermediate layer 504 on top of the base layer 506. In some embodiments, the intermediate layer 504 has a thickness of 1-25 μm. For example, the base layer 506 is a flexible polymer substrate film. As an example, the base layer 506 is a PC film substrate.

In some embodiments, the patterned layer 502 is formed by dispensing a curable solution dispensed and contacting the solution with a patterned template (e.g., a flexible template, a rigid template). The solution is then cured to solidify the pattern (formed by the template) of the patterned layer 502.

The interactions between the solution and an adjacent layer may be critical for imprint lithography to reduce defects. Additionally, the solution may be spread across the substrate, may not degrade the composition of the underlying polymer substrate, and may need to possess desirable mechanical strength and strong adhesion to the adjacent layer. In display applications such as wearable waveguide devices (e.g., a waveguide (e.g., a waveguide 2402 of eyepiece 2108 or 2110) of a wearable head device eyepiece or a MR system, as described with respect to FIGS. 1-4), high fidelity imprints (e.g., on base layer 506, such as smooth flexible polymer films) may be required to be used in Plate-to-Plate, Plate-to-Roll, Roll-to-Roll, and/or Roll-to-Plate imprint for nanoscale pattern transfer over large areas (e.g., 25 mm to 450 mm width). The intermediate layer 504 advantageously improve the patterns by reducing the negative effects in a cost effective manner (e.g., by using low-cost material, compared to silicon, described herein to form the structure 500 and reducing associated defects; by minimizing defects on a flexible substrate), and thereby, allowing an end product to be produced with minimal defects in a cost effective manner over a large area.

In some instances, without the intermediate layer 504 (e.g., the solution is dispensed over a bare PC layer), the adhesion mechanism may be physical interlocking between the patterned layer and the bare PC layer, which causes swelling into substrate and subsequently, defects. Additionally, without the intermediate layer 504, for patterned layer containing certain solvent type components, the chemical interaction with the substrate (e.g., within a few hundred nanometers of the interface in the substrate) may degrade the surface interface due to local dissolution, causing poor adhesion and leading to nano-scale voids. In some instances, a component of the patterned layer may permeate through the PC surface and cause a local chemical interaction, which may lead to poor adhesion and defects during imprinting. Without the intermediate layer 504, more imprint defects may be created, and more results of the defect may be transferred to an end device (e.g., degrading intended optical properties of a waveguide being formed).

For example, without the intermediate layer 504, defects such as nano-scale voids may more likely exist on the patterned layer. In some examples, without the intermediate layer 504, even if the patterned layer is sufficiently thick, to cover topographical and roughness imperfections of a base layer (e.g., a substrate, a film), nano-scale voids may still more likely persist due to chemical swelling and/or attack of organic material from the patterned layer to the base layer. In these examples, the nano-scale voids may be transferred to an end device fabricated using the defective patterned layer (e.g., the nano-scale voids may be transferred onto a waveguide, creating an undesired pattern on the waveguide).

In some instances, even though a patterned layer (e.g., a medium viscosity resist) directly bonded to a base layer may show little to no nano-scale void or adhesion defects, without the intermediate layer 504, the patterned layer may nonetheless experience poor adhesion strength to the base layer (e.g., a bare PC substrate) and/or experience macroscopic adhesion failure, leading to delamination. Therefore, patterned layer adhesion to a base layer may not rely on physical bonding alone (e.g., due to polymer chain entanglement on the surface). The intermediate layer 504 advantageously adds adequate covalent bonding to provide adhesion required for high imprint fidelity over large areas (e.g., used for a waveguide (e.g., a waveguide 2402 of eyepiece 2108 or 2110) of a wearable head device or a MR system, as described with respect to FIGS. 1-4). For example, the structure 500 is used to create another structure, and by including the intermediate layer 504 in the structure 500, delamination is less likely to occur when the structure 500 is used as a mold to create the other structure. Additionally, in some embodiments, the intermediate layer 504 advantageously creates strong adhesion through formation of covalent bonds without impacting the integrity of an interface on the substrate.

In some instances, the intermediate layer 504 improves adhesion (e.g., reduces delamination while the patterned layer 502 is used to create another structure) where the patterned layer 502 may not form an adhesive bond with the base layer 506 (e.g., when the patterned layer is bonded to the based layer without the intermediate layer 504, there might be locations where an adhesive bond may not form). For example, the intermediate layer 504 enables covalent bonding (e.g., with the patterned layer 502, with the base layer 506) via a top coat of the intermediate layer 504 (e.g., via free vinyl groups within the top coat) and/or enables robust physical bonding due to the intermediate layer 504's penetration through an interface with the patterned layer 502 or the base layer 506. In some embodiments, the top coat of the intermediate layer 504 is configured to be resistant to local dissolution (e.g., by components of the patterned layer 502), resulting a defect-reduced imprint (e.g., at the nano-scale, at the micro-scale), otherwise not achievable by bonding the patterned layer directly to the base layer.

Figure 6A:
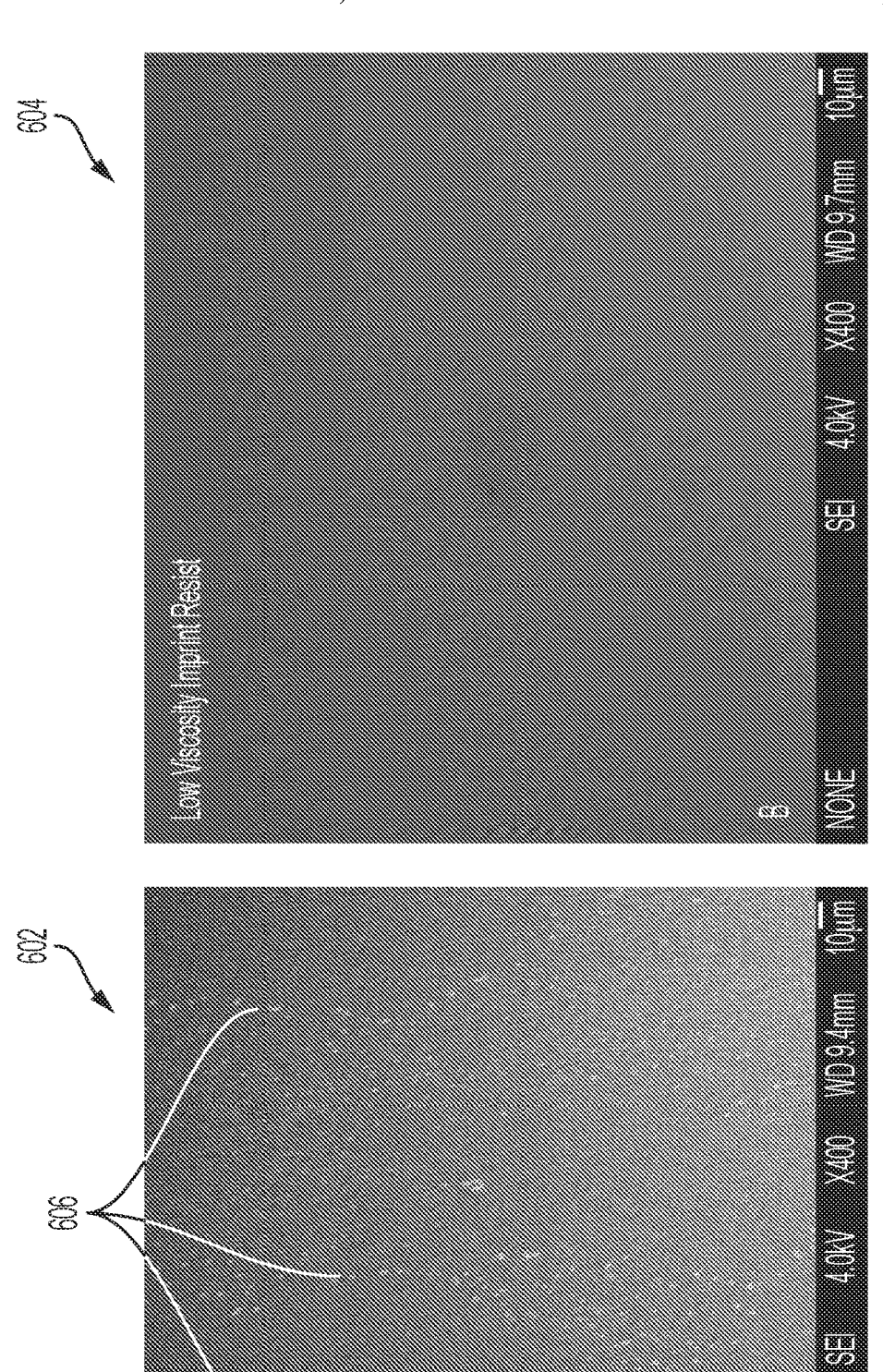
FIGS. 6A-6B illustrate exemplary characteristics of a structure, according to embodiments of the disclosure.
Figure 6B:
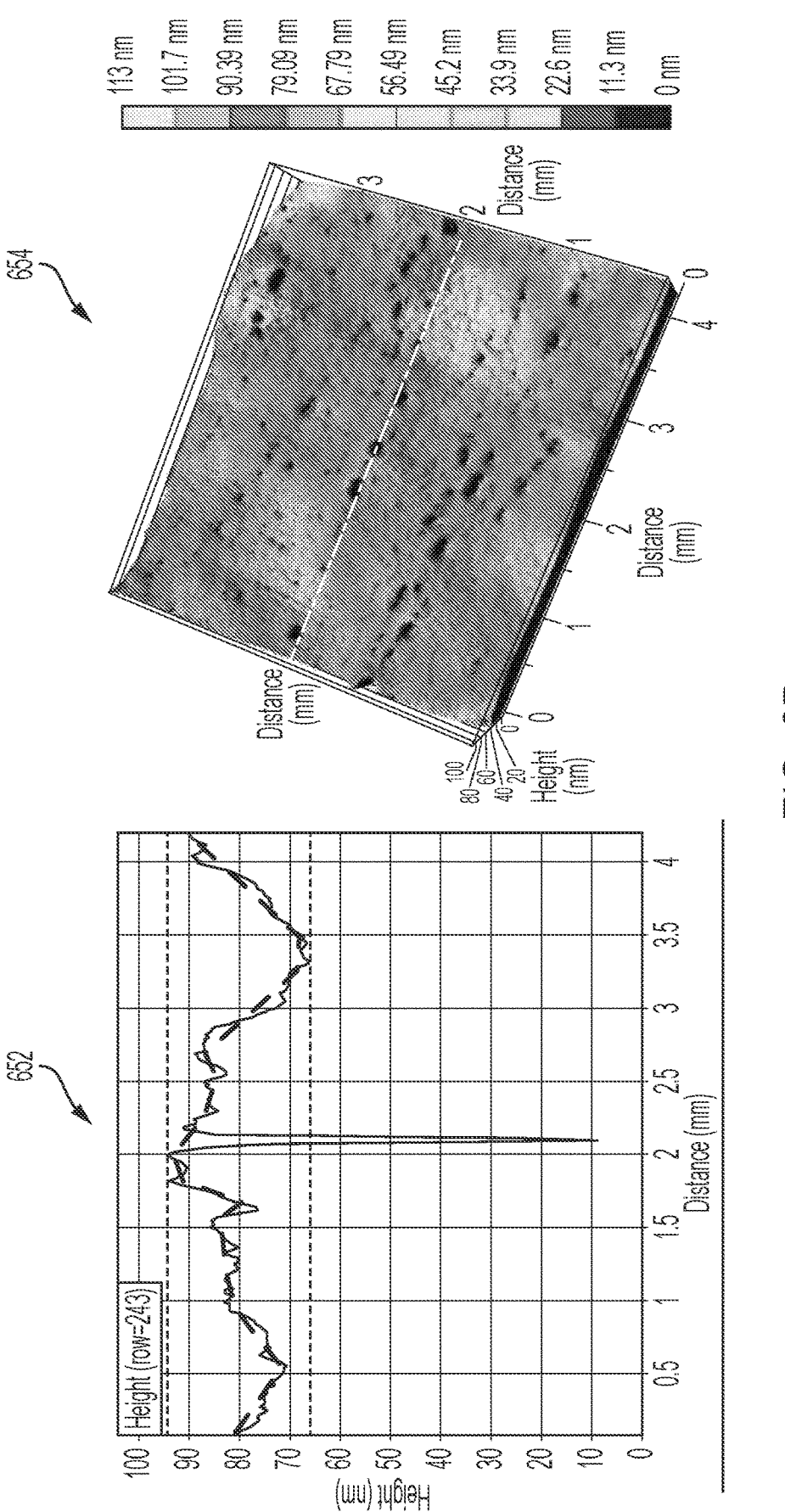

For imprinting over the base layer 506 (e.g., a polymeric substrate), the intermediate layer 504 may advantageously provide the following: 1) an adhesion layer for the patterned layer 502 (e.g., a cured imprinted polymer) to the base layer 506 (e.g., a polymer substrate); 2) a barrier layer to any undesirable chemical interaction of at any component of the patterned layer 502 (e.g., an imprint solution) with the base layer 506 (e.g., a polymer substrate) before curing; and 3) a smoother topography, compared to a bumpier or less uniform patterned layer without the intermediate layer (e.g., as illustrated with respect to FIGS. 6A and 6B). The multi-layer coating architecture may ensure high feature fidelity imprints (e.g., for display applications such as wearable waveguide devices) that require excellent adhesion, fluid spreading/filling, and optimum release performance upon template creation and demolding.

FIGS. 6A-6B illustrate exemplary characteristics of a structure, according to embodiments of the disclosure. As shown, FIGS. 6A and 6B are scanning electron microscope (SEM) images showing a topography of the patterned layer. FIG. 6A shows an image 602 of a patterned layer of a structure that does not include an intermediate layer. The image 602 shows adhesion failure and voids 606 on the patterned layer of a structure that does not include an intermediate layer.

FIG. 6A also shows an image 604 of a patterned layer (e.g., patterned layer 502) of a structure (e.g., structure 500) that includes an intermediate layer (e.g., intermediate layer 504). The image 604 shows almost no visible adhesion failure or voids on the patterned layer of a structure that includes an intermediate layer.

FIG. 6B shows a color cross sectional view 652 of surface topography of a structure (e.g., structure 500) that includes an intermediate layer (e.g., intermediate layer 504). For example, the surface topography 652 shows a topography of a UV Crosslinked Thermosetting Acrylate Polymer Coating. FIG. 6B also shows an isometric view 654 of surface topography of a structure (e.g., structure 500) that includes an intermediate layer (e.g., intermediate layer 504).

As shown by the cross sectional view 652 and the isometric view 654, the topography of the structure comprises a 20-25 nm waviness across a 4 mm section of the structure. In some embodiments, the topography of the structure (e.g., a structure comprising an intermediate layer) shown in FIG. 6B has a residual layer thickness (RLT) uniformity that is improved by more than 50% (e.g., compared 40-50 nm waviness without the intermediate layer), compared to a structure that does not comprise an intermediate layer. In some embodiments, the uniformity may be further improved by increasing a thickness of a patterned layer (e.g., patterned layer 502) bonded to an intermediate layer (e.g., intermediate layer 504). For example, the thickness of the patterned layer may be increased by adding additional layers over a first coating layer of the patterned layer (e.g., by adding an additional layer (e.g., having a thickness of 100-1000 nm) over a first 5 μm layer) or by depositing a thicker first coating layer (e.g., by depositing a layer thicker than 5 μm instead of a 5 μm layer).

Figure 7:
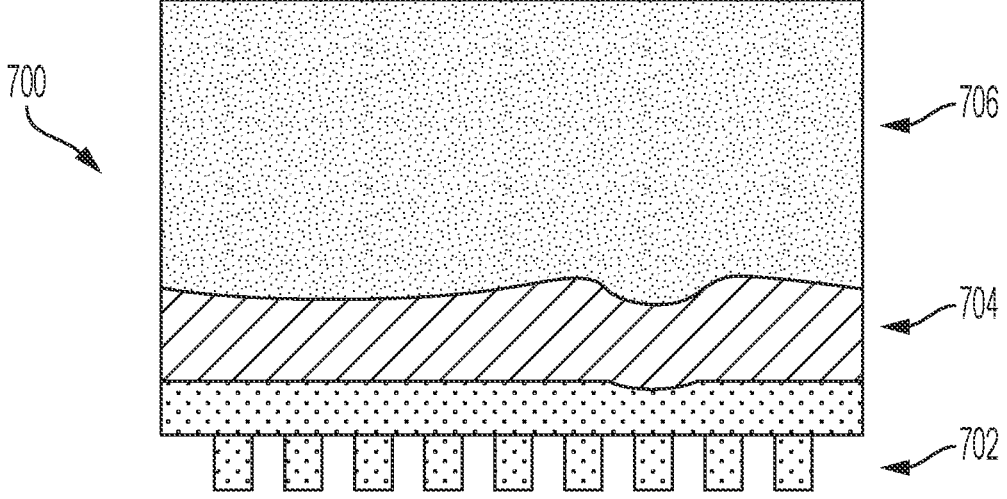
FIG. 7 illustrates exemplary structures, according to embodiments of the disclosure.

FIG. 7 illustrates an exemplary first structure 700 and second structure 710, according to embodiments of the disclosure. In some embodiments, the first structure 700 is an imprint. For example, the first structure 700 is an imprint for creating nano-scale or micro-scale structure (e.g., structure 710, an optical stack). In some embodiments, the first structure 700 comprises patterned layer 702, intermediate layer 704, and base layer 706. For example, the patterned layer 702 is a nano-patterned or micro-patterned imprint layer, the intermediate layer 704 is an intermediate imprint layer, and the base layer 706 is a carrier substrate or a carrier film. In some embodiments, the first structure 700 is structure 500 (e.g., patterned layer 702 is patterned layer 502, intermediate layer 704 is intermediate layer 504, and base layer 706 is base layer 506). For brevity, some advantages and features described with respect to FIGS. 5-6 are not described here.

In some embodiments, the first structure 700 is an imprint for creating second structure 710. For example, the patterned layer 702 is used to create the pattern 712 on the second structure 710. In some embodiments, the second structure 710 is an optical stack. In some embodiments, the pattern 712 comprises an optical feature (e.g., a waveguide pattern, a geometric feature on an optical stack (e.g., structure 710) configured to control transmissivity of radiation of a particular wavelength)). For example, the first structure 700 (e.g., a multi-layer coating imprint including a disclosed intermediate layer on a substrates (e.g., a PC or similar flexible/rigid substrates), structure 500 described with respect to FIGS. 5 and 6) may be used as a patterning template with the opposite pattern tone (e.g., pattern 712) of an end product (e.g., a mold for creating waveguide patterns).

In some embodiments, the pattern 712 is a waveguide pattern for a wearable head device or MR system disclosed herein. In some embodiments, the pattern 712 comprises an antireflective feature comprising dimensions of 10-150 nm (e.g., antireflective non-diffractive nanopattern having an exemplary pitch of less than 150 nm). In some embodiments, the pattern 712 comprises wire grid polarizers comprising dimensions of 10-100 nm. In some embodiments, the pattern 712 comprises optical gratings comprising dimensions of 100-1000 nm (e.g., gratings comprising optically diffractive features for wavelengths in the UV-infrared region having an exemplary pitch of greater than 150 nm). In some embodiments, the pattern 712 comprises optical alignment fiducials comprising dimensions of 0.1-1000 μm (e.g., align marks and/or fiducials for vision systems having an exemplary pitch of less than 1 μm).

The intermediate layer 704 can advantageously improve the patterns by reducing the negative effects in a cost effective manner (e.g., by using low-cost material, compared to silicon, described herein to form the structure 700 and reducing associated defects; by minimizing defects on a flexible substrate), allowing an end product (e.g., second structure 710) to be produced with minimal defects in a cost effective manner over a large area. Without the intermediate layer 704, more imprint defects may be created, and more results of the defect may be transferred to the structure 710 (e.g., degrading intended optical properties of a waveguide being formed). For example, without the intermediate layer 704, defects such as nano-scale voids may more likely exist on the patterned layer. In some examples, without the intermediate layer 704, even if the patterned layer is sufficiently thick, to cover topographical and roughness imperfections of a base layer (e.g., a substrate, a film), nano-scale voids may still more likely persist due to chemical swelling and/or attack of organic material from the patterned layer to the base layer. In these examples, the nano-scale voids may be transferred to an end device (e.g., structure 710) fabricated using the defective patterned layer (e.g., the nano-scale voids may be transferred onto a waveguide, creating an undesired pattern on the waveguide).

Figure 8:
FIG. 8 illustrates an exemplary method of fabricating an optical stack, according to embodiments of the disclosure.
Figure 8:
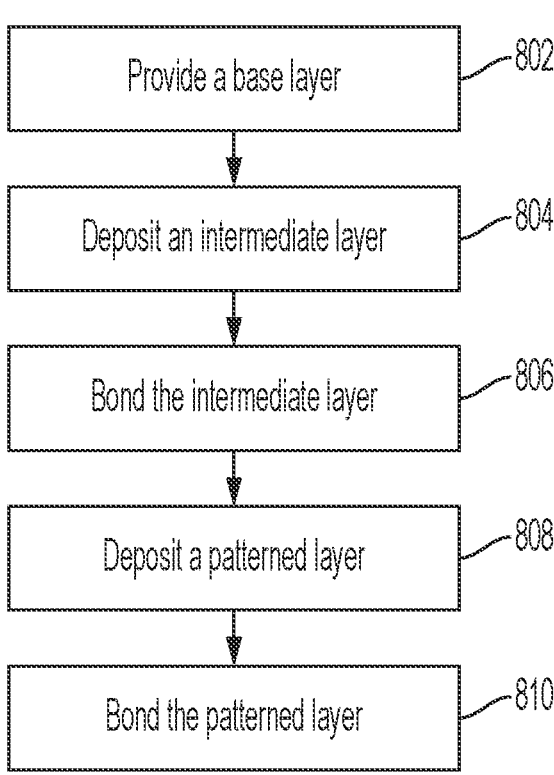

FIG. 8 illustrates an exemplary method 800 of fabricating an optical stack comprising an optical feature, according to embodiments of the disclosure. Although the method 800 is illustrated as including the described steps, it is understood that different order of steps, additional steps, or fewer steps may be included without departing from the scope of the disclosure. For brevity, some advantages and features described with respect to FIGS 5-7 are not described here.

In some embodiments, the method 800 includes providing a base layer (step 802). For example, as described with respect to FIGS. 5-7, a base layer (e.g., base layer 506, base layer 706) is provided. In some embodiments, the base layer comprises PC. For example, as described with respect to FIGS. 5-7, the base layer 506 or the base layer 706 comprises PC. In some embodiments, as described with respect to FIGS. 5-7, the base layer comprises a flexible substrate. For example, the base layer 506 or the base layer 706 comprises a flexible substrate.

In some embodiments, the method 800 includes depositing an intermediate layer on the base layer (step 804). For example, as described with respect to FIGS. 5-7, the intermediate layer 504 or 704 is deposited on the base layer 506 or 706. In some embodiments, the intermediate layer has a thickness of 1-25 μm. For example, as described with respect to FIGS. 5-7, the intermediate layer 504 or 704 has a thickness of 1-25 μm. In some embodiments, the intermediate layer comprises a crosslinked polymer coating. For example, as described with respect to FIGS. 5-7, the intermediate layer 504 or 704 comprises a crosslinked polymer coating.

In some embodiments, the method 800 includes bonding the intermediate layer to the base layer (step 806). For example, as described with respect to FIGS. 5-7, the intermediate layer 504 or 704 is bonded to the base layer 506 or 706.

In some embodiments, the method 800 includes depositing, on the intermediate layer, a patterned layer comprising a pattern corresponding to an optical feature (step 808). For example, as described with respect to FIGS. 5-7, the patterned layer 502 or 702 comprising a pattern corresponding to an optical feature is deposited on the intermediate layer 504 or 704. In some embodiments, depositing the patterned layer on the intermediate layer comprises imprinting, using slot-die, using micro gravure, using knife edge, using doctor blade, or spray coating. For example, as described with respect to FIGS. 5-7, the patterned layer 502 or 702 is deposited on the intermediate layer 504 or 704 using imprinting, slot-die, micro gravure, knife edge, doctor blade, or spray coating.

In some embodiments, the patterned layer has a thickness of 5 μm to 10 μm. For example, as described with respect to FIGS. 5-7, the patterned layer 502 or 702 has a thickness of 5 μm to 6 μm. In some embodiments, a width of the patterned layer is 25 mm to 450 mm. For example, as described with respect to FIGS. 5-7, the patterned layer 502 or 702 has a width of 25 mm to 450 mm.

In some embodiments, the patterned layer comprises Methacrylates or acrylates. For example, as described with respect to FIGS. 5-7, the patterned layer 502 or 702 comprises Methacrylates or acrylates. In some embodiments, the patterned layer comprises plastic. For example, as described with respect to FIGS. 5-7, the patterned layer 502 or 702 comprises plastic. In some embodiments, the patterned layer comprises polymers comprising epoxy and vinyl dual functionality. For example, as described with respect to FIGS. 5-7, the patterned layer 502 or 702 comprises epoxy and vinyl dual functionality. In some embodiments, patterned layer comprises a curable solution. For example, as described with respect to FIGS. 5-7, the patterned layer 502 or 702 comprises a curable solution.

In some embodiments, the method 800 includes bonding the patterned layer to the intermediate layer (step 810). For example, as described with respect to FIGS. 5-7, the patterned layer 502 or 702 is bonded onto the intermediate layer 504 or 704. In some embodiments, a bond between the patterned layer and the intermediate layer comprises a covalent bond, a physical bond, or both. For example, as described with respect to FIGS. 5-7, the bond between the patterned layer 502 and the intermediate layer 504 or between the patterned layer 702 and the intermediate layer 704 comprises a covalent bond, a physical bond, or both.

In some embodiments, the method 800 includes curing the patterned layer. For example, as described with respect to FIGS. 5-7, the patterned layer 502 or 702 is cured.

In some embodiments, a topography of the patterned layer comprises a waviness of 20 nm to 25 nm. For example, as described with respect to FIGS. 5-7, the topography of the patterned layer 502 or 702 comprises a waviness of 20 nm to 25 nm.

In some embodiments, the method include 800 includes forming the optical feature of the optical stack by using the patterned layer. For example, as described with respect to FIGS. 5-7, the topography of the patterned layer 502 or 702 is used to form an optical feature (e.g., pattern 712) of an optical stack (e.g., second structure 710). In some embodiments, forming the optical feature comprises Plate-to-Plate, Plate-to-Roll, Roll-to-Roll, or Roll-to-Plate imprinting. For example, as described with respect to FIGS. 5-7, Plate-to-Plate, Plate-to-Roll, Roll-to-Roll, or Roll-to-Plate imprinting and the structure 500 or 700 is used to form an optical feature (e.g., pattern 712).

In some embodiments, the pattern corresponding to the optical feature (e.g., pattern 712) is a waveguide pattern for a wearable head device or MR system disclosed herein. In some embodiments, the pattern corresponding to the optical feature (e.g., pattern 712) comprises an antireflective feature comprising dimensions of 10-150 nm (e.g., antireflective non-diffractive nanopattern having an exemplary pitch of less than 150 nm). In some embodiments, the pattern corresponding to the optical feature (e.g., pattern 712) comprises wire grid polarizers comprising dimensions of 10-100 nm. In some embodiments, the pattern corresponding to the optical feature (e.g., pattern 712) comprises optical gratings comprising dimensions of 100-1000 nm (e.g., gratings comprising optically diffractive features for wavelengths in the UV-infrared region having an exemplary pitch of greater than 150 nm). In some embodiments, the pattern corresponding to the optical feature (e.g., pattern 712) comprises optical alignment fiducials comprising dimensions of 0.1-1000 μm (e.g., align marks and/or fiducials for vision systems having an exemplary pitch of less than 1 μm).

In some embodiments, a system comprises a wearable head device comprising a display. The display comprises an optical stack (e.g., structure 710) comprising an optical feature (e.g., optical diffraction gratings, antireflective features, alignment fiducials), and the optical feature is formed using a structure described with respect to FIGS. 5-8. The system comprises one or more processors configured to execute a method comprising presenting, on the display, content associated with a mixed reality environment, wherein the content is presented based on the optical feature.

According to some embodiments, a structure for forming an optical feature comprises a patterned layer comprising a pattern corresponding to the optical feature; a base layer; and an intermediate layer bonded to the patterned layer and the base layer.

According to some embodiments, a bond between the patterned layer and the intermediate layer comprises a covalent bond, a physical bond, or both.

According to some embodiments, the base layer comprises PC.

According to some embodiments, the intermediate layer has a thickness of 1-25 μm.

According to some embodiments, the patterned layer has a thickness of 5 μm to 6 μm.

According to some embodiments, a width of the patterned layer is 25 mm to 450 mm.

According to some embodiments, the patterned layer is configured to form a pattern of a waveguide.

According to some embodiments, a topography of the patterned layer comprises a waviness of 20 nm to 25 nm.

According to some embodiments, the patterned layer comprises Methacrylates or acrylates.

According to some embodiments, the patterned layer comprises plastic.

According to some embodiments, the patterned layer comprises polymers comprising epoxy and vinyl dual functionality.

According to some embodiments, the patterned layer comprises a curable solution.

According to some embodiments, the intermediate layer comprises a crosslinked polymer coating.

According to some embodiments, the base layer comprises a flexible substrate.

According to some embodiments, the patterned layer is configured to form an antireflective feature comprising dimensions of 10-150 nm.

According to some embodiments, the patterned layer is configured to form wire grid polarizers comprising dimensions of 10-100 nm.

According to some embodiments, the patterned layer is configured to form optical gratings comprising dimensions of 100-1000 nm.

According to some embodiments, the patterned layer is configured to form optical alignment fiducials comprising dimensions of 0.1-1000 μm.

According to some embodiments, a method of fabricating an optical stack comprising an optical feature, comprises: providing a base layer; depositing an intermediate layer on the base layer; bonding the intermediate layer to the base layer; depositing, on the intermediate layer, a patterned layer comprising a pattern corresponding to the optical feature; and bonding the patterned layer to the intermediate layer.

According to some embodiments, the method further comprises forming the optical feature of the optical stack by using the patterned layer.

According to some embodiments, the optical stack is a waveguide.

According to some embodiments, forming the optical feature comprises Plate-to-Plate, Plate-to-Roll, Roll-to-Roll, or Roll-to-Plate imprinting.

According to some embodiments, the method further comprises curing the patterned layer.

According to some embodiments, depositing the patterned layer on the intermediate layer comprises imprinting, using slot-die, using micro gravure, using knife edge, using doctor blade, or spray coating.

According to some embodiments, a bond between the patterned layer and the intermediate layer comprises a covalent bond, a physical bond, or both.

According to some embodiments, the base layer comprises PC.

According to some embodiments, the intermediate layer has a thickness of 1-25 μm.

According to some embodiments, the patterned layer has a thickness of 5 μm to 6 μm.

According to some embodiments, a width of the patterned layer is 25 mm to 450 mm According to some embodiments, a topography of the patterned layer comprises a waviness of 20 nm to 25 nm.

According to some embodiments, the patterned layer comprises Methacrylates or acrylates.

According to some embodiments, the patterned layer comprises plastic.

According to some embodiments, the patterned layer comprises polymers comprising epoxy and vinyl dual functionality.

According to some embodiments, the patterned layer comprises a curable solution.

According to some embodiments, the intermediate layer comprises a crosslinked polymer coating.

According to some embodiments, the base layer comprises a flexible substrate.

According to some embodiments, the pattern comprises an antireflective feature comprising dimensions of 10-150 nm.

According to some embodiments, the pattern comprises wire grid polarizers comprising dimensions of 10-100 nm.

According to some embodiments, the pattern comprises optical gratings comprising dimensions of 100-1000 nm.

According to some embodiments, the pattern comprises optical alignment fiducials comprising dimensions of 0.1-1000 μm.

According to some embodiments, a system comprises a wearable head device comprising a display. The display comprises an optical stack comprising an optical feature, and the optical feature is formed using a structure described above. The system comprises one or more processors configured to execute a method comprising presenting, on the display, content associated with a mixed reality environment, wherein the content is presented based on the optical feature.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. An apparatus comprising:
a waveguide comprising an optical stack, the optical stack comprising:
  a patterned layer comprising a pattern corresponding to an optical feature, wherein the patterned layer is configured to form a pattern of a waveguide;
  a base layer; and
  an intermediate layer bonded to the patterned layer and to the base layer, wherein the optical feature is disposed over the intermediate layer.

2. The apparatus of claim 1, wherein a bond between the patterned layer and the intermediate layer comprises one or more of a covalent bond and a physical bond.

3. The apparatus of claim 1, wherein the base layer comprises Polycarbonate.

4. The apparatus of claim 1, wherein the intermediate layer has a thickness of 1 μm to 25 μm.

5. The apparatus of claim 1, wherein the patterned layer has a thickness of 5 μm to 6 μm.

6. The apparatus of claim 1, wherein a width of the patterned layer is 25 mm to 450 mm.

7. The apparatus of claim 1, wherein the patterned layer comprises Methacrylate or acrylate.

8. The apparatus of claim 1, wherein the intermediate layer comprises a crosslinked polymer coating.

9. A system comprising:
a wearable head-mounted device comprising a display, wherein:
  the display comprises a waveguide comprising an optical stack, the optical stack comprising:
    a patterned layer comprising a pattern comprising an optical feature, wherein the patterned layer forms an optical grating;
    a base layer; and
    an intermediate layer between and bonded to the patterned layer and to the base layer, wherein the optical feature is disposed over the intermediate layer; and
one or more processors configured to execute a method comprising:
  presenting, on the display, content associated with a mixed reality environment, wherein presenting the content comprises propagating light via the optical grating.

10. The system of claim 9, wherein the patterned layer comprises plastic.

11. The system of claim 9, wherein the patterned layer comprises a polymer having epoxy and vinyl dual functionality.

12. The of claim 9, wherein the base layer comprises a flexible substrate.

13. The system of claim 9, wherein the pattern comprises an antireflective feature having a pitch of 10 nm to 150 nm.

14. The system of claim 9, wherein the pattern comprises wire grid polarizers having a dimension of 10 nm to 100 nm.

15. The system of claim 9, wherein the pattern comprises optical gratings having a pitch of 100 nm to 1000 nm for optical diffraction.

16. The system of claim 9, wherein the pattern comprises an optical alignment fiducials having a pitch of 0.1 μm to 1000 μm.

\* \* \* \* \*